(12) United States Patent
Yang et al.

(10) Patent No.: US 7,267,359 B1
(45) Date of Patent: Sep. 11, 2007

(54) COLLAPSIBLE STROLLER FRAME

(75) Inventors: Cheng-Fan Yang, Tainan Hsien (TW); Hung-Chung Hou, Chiayi County (TW); Sen-Yung Jiang, Yunlin County (TW)

(73) Assignee: Link Treasure Limited, Tortola (VG)

( * ) Notice: Subject to any disclaimer, the term of this patent is extended or adjusted under 35 U.S.C. 154(b) by 0 days.

(21) Appl. No.: 11/448,813

(22) Filed: Jun. 8, 2006

(51) Int. Cl.
*B62B 7/00* (2006.01)
*B62B 3/00* (2006.01)
*B62B 11/00* (2006.01)

(52) U.S. Cl. .................. 280/642; 280/643; 280/647; 280/650; 280/47.34; 280/47.38

(58) Field of Classification Search .............. 280/47.34, 280/47.38, 642, 643, 647, 650
See application file for complete search history.

(56) References Cited

U.S. PATENT DOCUMENTS

| | | | | |
|---|---|---|---|---|
| 5,772,235 A | * | 6/1998 | Espenshade | 280/643 |
| 5,823,564 A | * | 10/1998 | Kettler | 280/642 |
| 7,032,922 B1 | * | 4/2006 | Lan | 280/648 |
| 2002/0175498 A1 | * | 11/2002 | Yang et al. | 280/648 |
| 2002/0195797 A1 | * | 12/2002 | Song | 280/642 |
| 2003/0111825 A1 | * | 6/2003 | Lo et al. | 280/642 |
| 2004/0046364 A1 | * | 3/2004 | Chen | 280/642 |
| 2005/0098982 A1 | * | 5/2005 | Huang | 280/642 |
| 2006/0071452 A1 | * | 4/2006 | Yeh | 280/642 |
| 2006/0237949 A1 | * | 10/2006 | Hou et al. | 280/642 |

FOREIGN PATENT DOCUMENTS

GB      2186793 A    *   8/1987

* cited by examiner

*Primary Examiner*—Christopher P. Ellis
*Assistant Examiner*—John R. Olszewski
(74) *Attorney, Agent, or Firm*—Birch, Stewart, Kolasch & Birch, LLP

(57) ABSTRACT

A collapsible stroller frame capable of being either collapsed or expanded with a rod set, wherein a slide sleeve is located at a front supporter of the stroller frame and a foldable supporter is pivotally connected between the front supporter and a rear supporter. A link rod connects the slide sleeve and the foldable supporter, and is pivotally connected between the front and rear supporter. The foldable supporter includes a front folding tube and a rear folding tube, pivotally connected to each other. A user can operate the foldable supporter to shorten the distance between the front and rear folding tubes, by disengaging the slide sleeve from the frame, thereby facilitating assembly and folding of the stroller.

16 Claims, 7 Drawing Sheets

COLLAPSIBLE STROLLER FRAME

FIELD OF THE INVENTION

The present invention relates to a stroller frame and, in particular, to a stroller frame which can be converted between an expanded position and a collapsed position.

DESCRIPTION OF THE RELATED ART

Conventional strollers are configured with sets of link rods which are pivotally connected to each other. A release device is arranged so as to control a hinge located at the sets of link rods, the hinge having a latch which can be locked or released so as to move the stroller between an expanded position and a collapsed position, as can be seen in U.S. Pat. No. 5,772,235, for example. However, this type of conventional stroller frame is complicated, and therefore difficult to assemble and manipulate.

SUMMARY OF THE INVENTION

In order to overcome the disadvantages of the conventional stroller, the present invention provides a slide sleeve movably mounted on the front supporter, a foldable supporter comprising a front supporter and a rear supporter, and a link rod. The link rod has one end connected between the slide sleeve and foldable supporter, and another end pivotally connected between the front and rear supporter. The foldable supporter includes a front folding tube and a rear folding tube which are pivotally connected to each other. When the slide sleeve is engaged with the stroller frame, the frame is moved to an expanded position. The stroller frame can be also folded by disengaging the slide sleeve from the frame and shortening the distance between the front and rear folding tube. This combination of features facilitates assembly of the stroller, as well as the process of expanding and collapsing the same.

Further scope of applicability of the present invention will become apparent from the detailed description given hereinafter. However, it should be understood the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1:
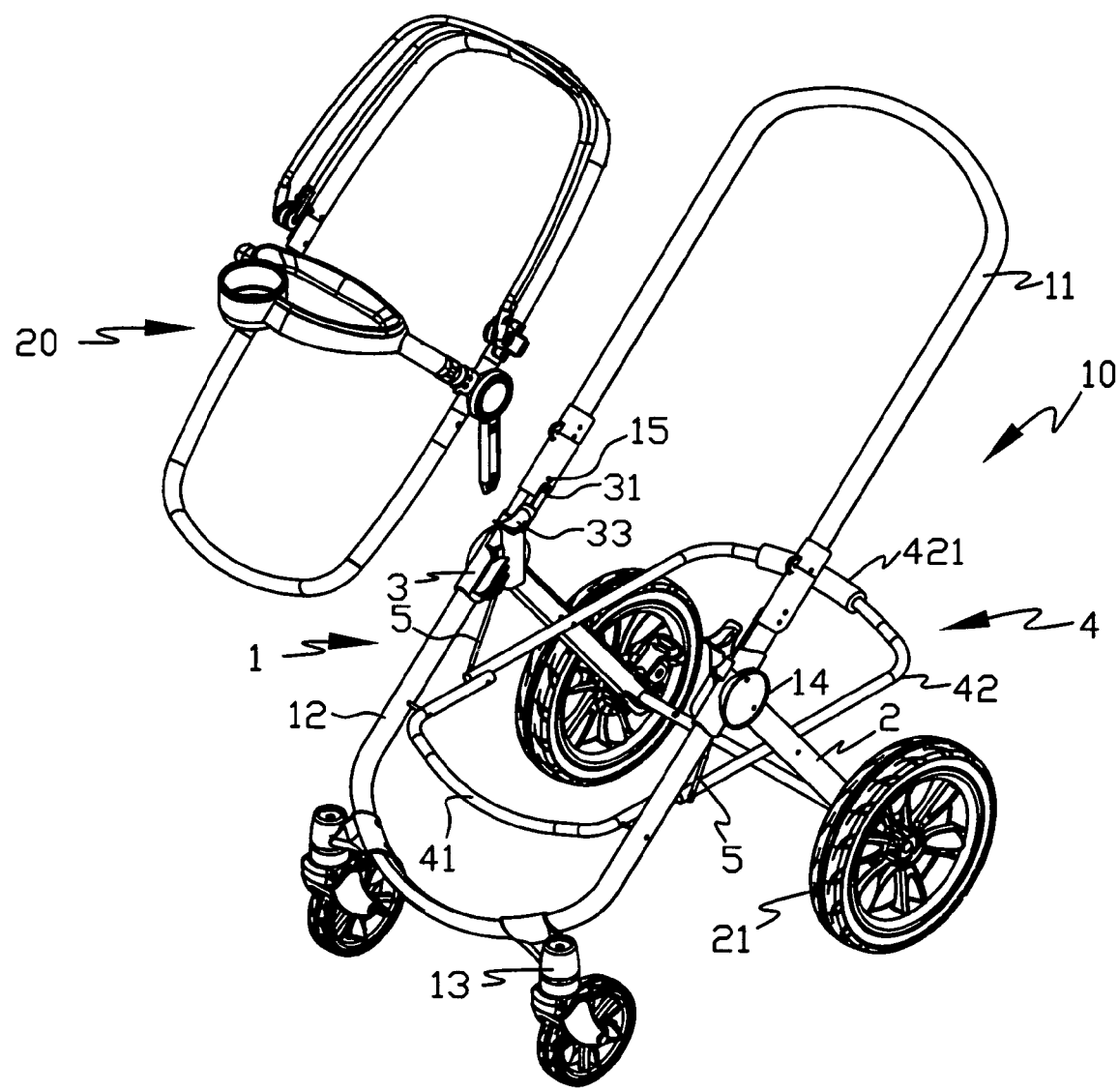
FIG. 1 is a front, left perspective view of the collapsible stroller frame in an expanded position.
Figure 2:
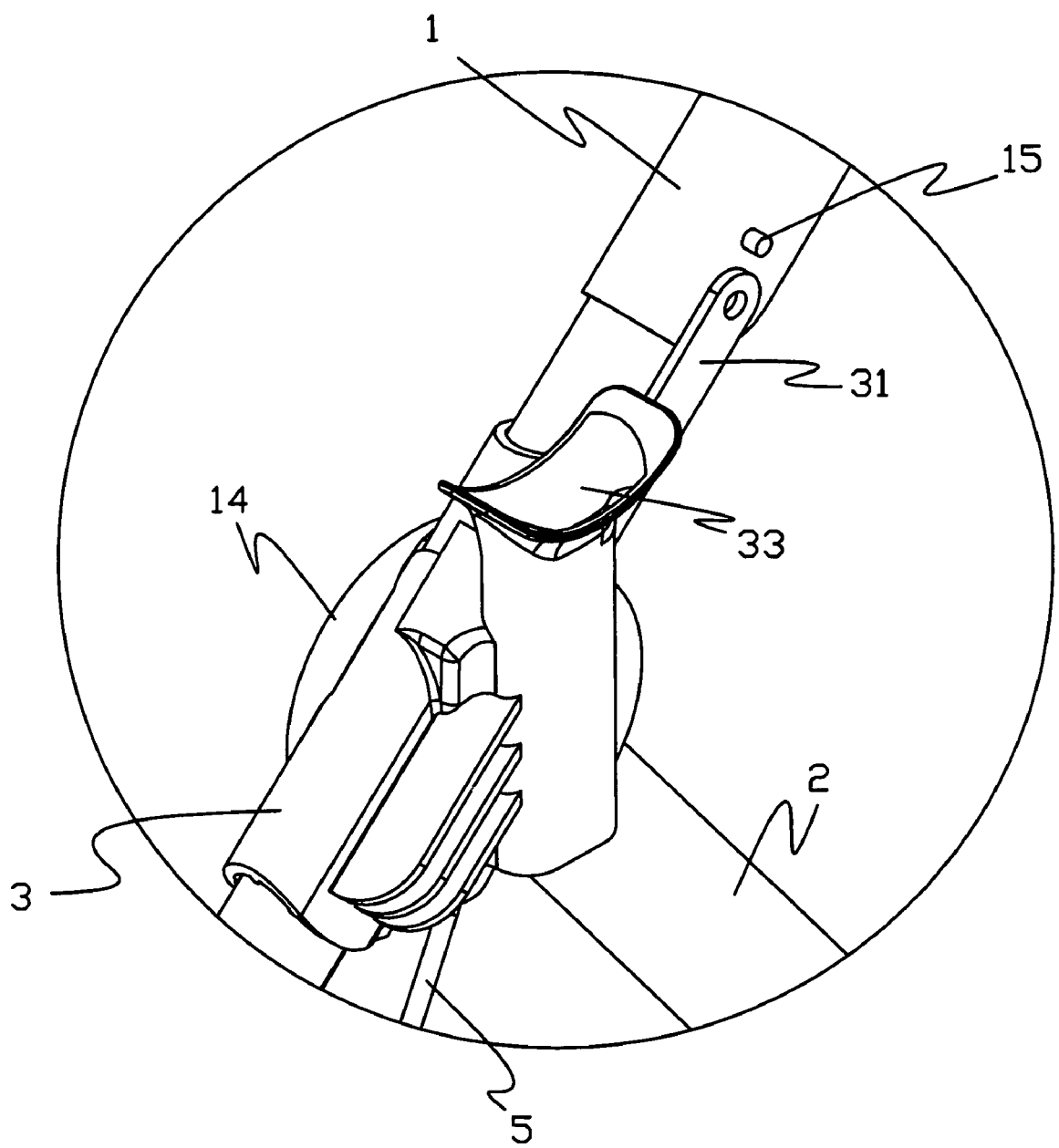
FIG. 2 is a close-up of the slide sleeve.

Referring to FIGS. 1 and 2, the stroller includes a frame 10 which can either be folded or expanded and is provided with a seat 20 for accommodating the child. The frame 10 includes a front supporter 1, a rear supporter 2, a slide sleeve 3, a foldable supporter 4 and a link rod 5.

The front supporter includes a handle portion 11 and a leg portion 12, wherein a user pushes the handle portion 11 in order to move the stroller. The leg portion 12 may be configured as a straight line extension of the handle portion 11. The lower end of the leg portion is connected with a front wheel set 13. Also, the handle portion 11 can be configured as one-piece with the leg portion 12.

Figure 6:
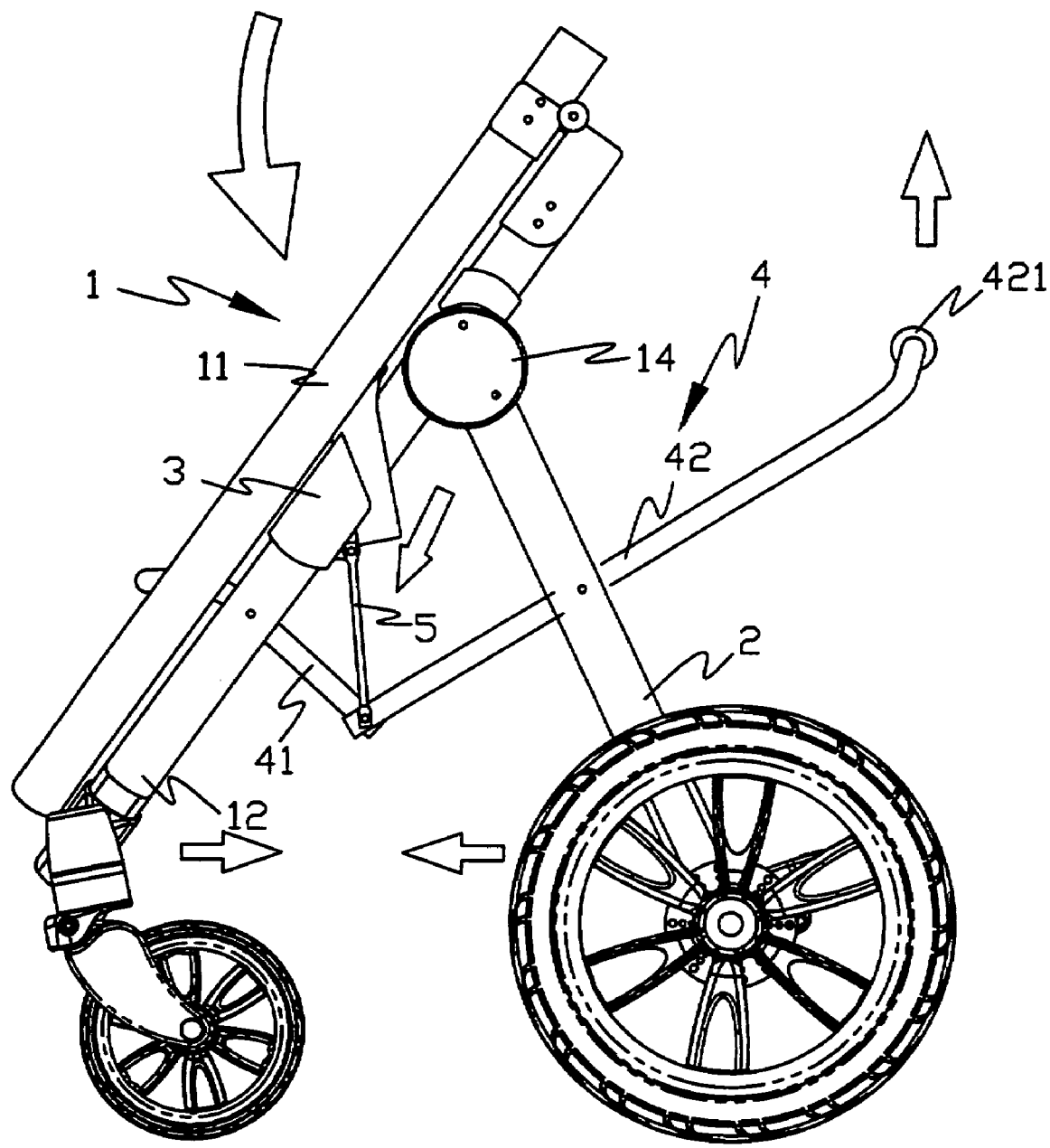
FIG. 6 is a left side view of the frame showing the direction of movement of various components during folding of the frame.

In the collapsible stroller frame of the present invention, the handle portion 11 is pivotally connected to the leg portion 12, each of which are configured in a U-like shape. When the frame 10 is in an expanded position, a closed, oval-like shape is formed by the combination of the handle portion 11 and the leg portion 12. As shown in FIG. 6, the handle portion 11 is bent downwardly to the leg portion 12 when the frame 10 is folded, so as to reduce the overall size of the frame 10 after collapsing thereof. It should be appreciated that certain changes could be made to the collapsible stroller frame of the present invention, such as by making the handle portion 11 expandable and contractible (not shown) in or outside of the leg portion 12, so that the height can be adjusted and the size of the frame reduced after folding. It is preferable, however, to set a connecting base 14 to fix the leg portion 12.

Figure 3:
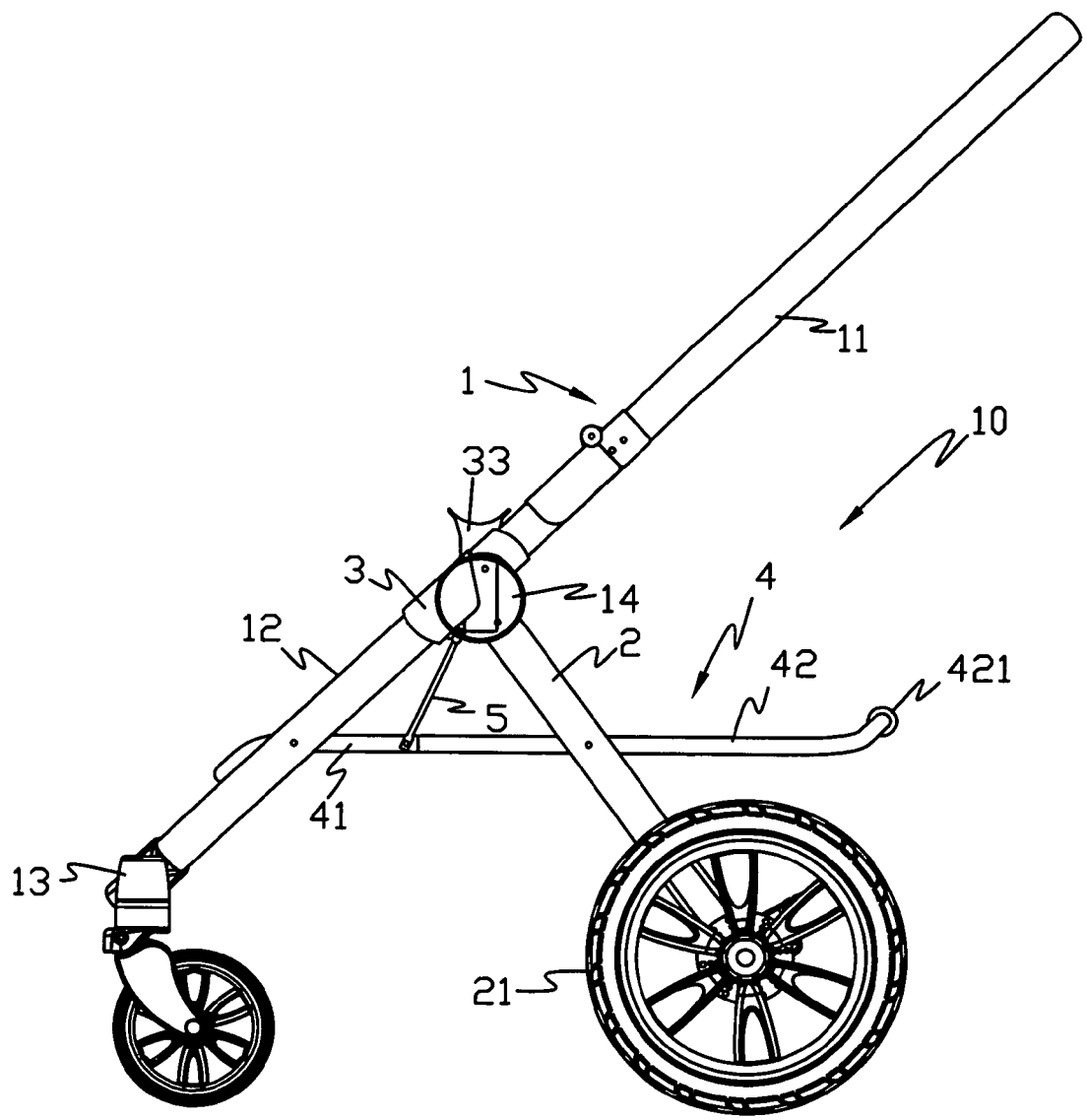
FIG. 3 is a left side view of the frame in an expanded position.

As shown in FIG. 3, the upper end of the rear supporter 2 is pivotally connected to the connecting base 14, and the lower end is connected to a rear wheel set 21. The slide sleeve 3 is movably mounted on the leg portion 12. Preferably, the slide sleeve 3 is designed to detachably lock the frame 10, so as to fix the frame 10 in an expanded position.

Figure 4:
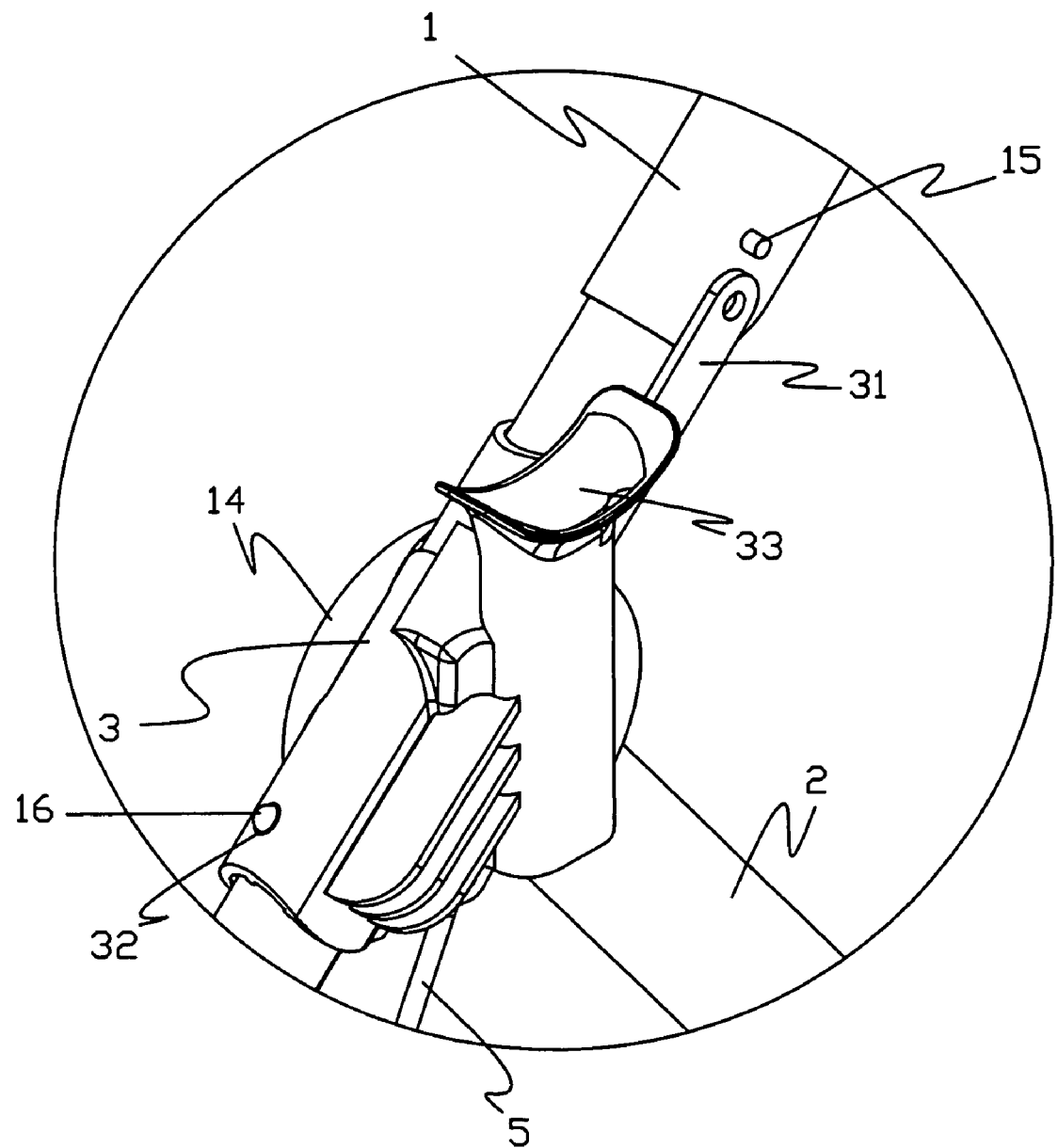
FIG. 4 is a close-up of a positioning hole on the slide sleeve.

Referring again to FIG. 2, the slide sleeve 3 extends with an elastic positioning piece 31 which can be used to engage the positioning projection 15 disposed on the front supporter 1. It should be appreciated that certain changes could be made to the present invention, such as locking the slide sleeve 3 to frame 10, for instance, in order to lock the slide sleeve 3 to the connecting base 14 (not shown). Another variation is shown in FIG. 4, wherein a positioning hole 32 is located at the slide sleeve 3 and engaged with the elastic projection 16 of the leg portion 12. It should be appreciated that the present invention could accommodate a wide variety of locking methods, and is therefore not limited to any specific lock mechanism. A preferred embodiment would be to dispose a socket 33 on the slide sleeve 3 for setting up the seat 20. Therefore, when folding the frame 10, the seat 20 is moved and folded along with the slide sleeve 3.

Figure 5:
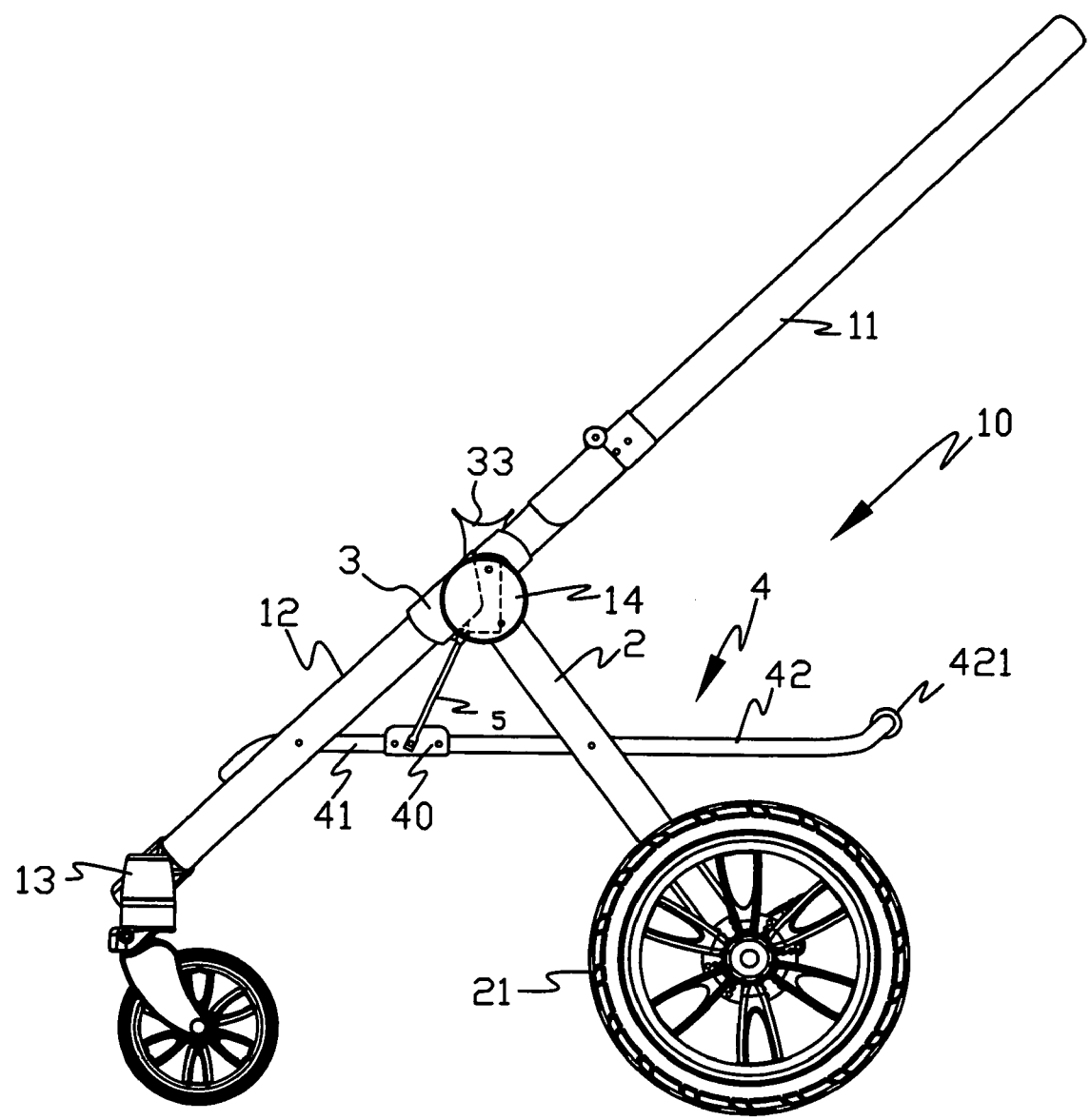
FIG. 5 is a left side view of the frame, showing the pivoting base disposed on the foldable supporter.

In FIG. 5, the foldable frame 4 is pivotally connected between the front supporter 1 and rear supporter 2, and includes the front folding tube 41 and rear folding tube 42, wherein the front folding tube 41 is pivotally connected to the front supporter 1 and the rear folding tube 42 is pivotally connected to the rear supporter 2. One end of the front folding tube 41 is coupled to one end of the rear folding tube 42. It would be preferable to pivotally connect the front folding tube 41 and rear folding tube 42 via a pivoting base 40. It would also be preferable to arrange a handle grip 421 behind the rear folding tube 42 to facilitate holding and pulling of the frame 10 upon folding by a user.

The link rod 5 is connected between the slide sleeve 3 and foldable supporter 4. In a preferred embodiment of the invention, one end of the link rod 5 is pivotally connected to the front folding tube 41 and rear folding tube 42 on the same pivot point, or connected to the pivoting base 40.

Figure 7:
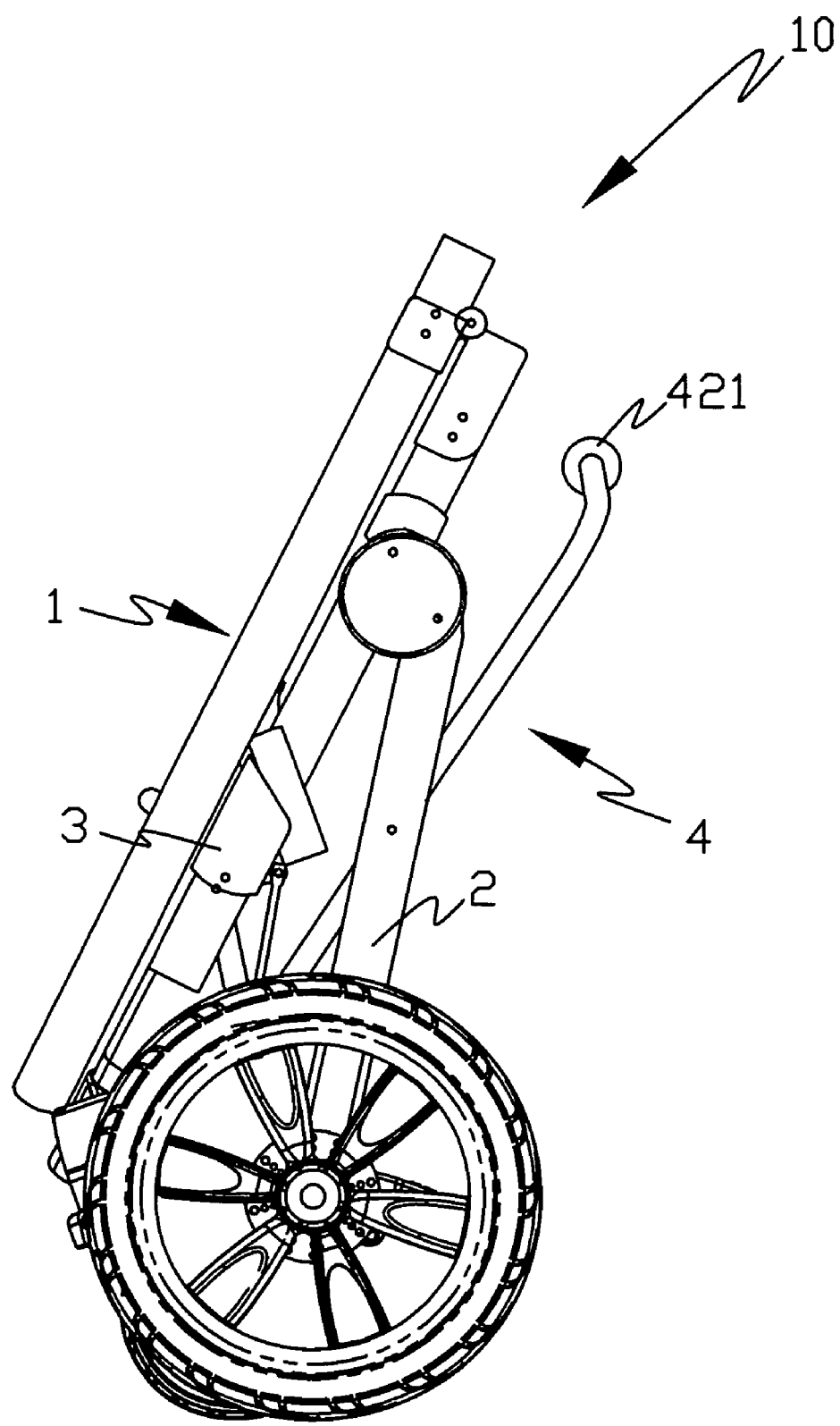
FIG. 7 is a left side view of the frame in a collapsed position.

Referring to FIGS. 2 and 5, upon expansion of the frame 10, the sliding sleeve 3 and the frame 10 are locked upon the leg portion 12, and the front folding tube and the rear folding tube are both in an approximately horizontal plane. Further, referring to FIGS. 2, 6 and 7, in order for a user to fold the frame 10, the sliding sleeve 3 is released from the frame 10 by disengaging the positioning piece 31 from the positioning projection 15. At the same time, the handle grip 421 of the rear folding tube 42 is pulled upwardly and rotated, thereby forcing the sliding sleeve 3 to move down along the leg portion 12 via the link rod 5, so as to configure and fold the front folding tube 41 and the rear folding tube 42 into a V-like shape. In addition, the front supporter 1 and rear supporter 2 are easily drawn close together into a folded position.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A collapsible stroller frame, comprising:
   a front supporter, including a handle portion and a leg portion, wherein a lower end of the leg portion is provided with a front wheel set;
   a rear supporter, having an upper end pivotally connected to the front supporter and a lower end provided with a rear wheel set;
   a sliding sleeve, movably mounted on the front supporter, wherein the sliding sleeve detachably locks the frame into an expanded position; and
   a foldable supporter, including a front folding tube and a rear folding tube pivotally connected to each other, the foldable supporter being pivotally connected between the front supporter and the rear supporter; and
   a link rod, connected between the sliding sleeve and the foldable supporter,
   wherein upon folding the frame, the sliding sleeve is released from the frame, thereby driving the foldable support, and wherein the sliding sleeve moves down the front supporter in connection with the link rod, thereby causing the front folding tube and the rear folding tube to fold into a V-shape to draw the front supporter close to the rear supporter into a folded position.

2. The collapsible stroller frame of claim 1, wherein the sliding sleeve is provided with a socket for positioning a seat, so as to allow the seat to move with the sliding sleeve during folding of the frame.

3. The collapsible stroller frame of claim 1, wherein the handle portion and the leg portion are made in one-piece.

4. The collapsible stroller frame of claim 1, wherein the handle portion pivots and rotates toward the leg portion during folding of the frame.

5. The collapsible stroller frame of claim 1, wherein the handle portion slides inside the leg portion when the frame is expanded or collapsed.

6. The collapsible stroller frame of claim 1, wherein the handle portion and the leg portion are configured in a closed, oval shape.

7. The collapsible stroller frame of claim 1, wherein one end of the front folding tube is pivotally connected to one end of the rear folding supporter.

8. The collapsible stroller frame of claim 7, wherein one end of the link rod, the front folding tube and the rear folding tube are pivotally connected to the same pivot point.

9. The collapsible stroller frame of claim 1, wherein one end of the link rod, the front folding tube and the rear folding tube are pivotally connected to a pivoting base.

10. The collapsible stroller frame of claim 1, wherein the sliding sleeve and the front supporter are mutually lockable.

11. The collapsible stroller frame of claim 10, wherein a positioning piece extends from the sliding sleeve.

12. The collapsible stroller frame of claim 11, wherein the leg portion is provided with a positioning projection which locks with the positioning piece.

13. The collapsible stroller frame of claim 1, wherein the sliding sleeve is provided with a positioning hole which locks with an elastic projection on the leg portion.

14. The collapsible stroller frame of claim 1, wherein the front supporter has a connecting base for pivotally connecting to the rear supporter.

15. The collapsible stroller frame of claim 14, wherein the sliding sleeve is lockable with the connecting base.

16. The collapsible stroller frame of claim 1, wherein the rear folding tubes is provided with a handle grip which is pulled up to fold the frame.

\* \* \* \* \*